(12) United States Patent
Onozeki et al.

(10) Patent No.: US 7,221,830 B2
(45) Date of Patent: May 22, 2007

(54) METHOD AND APPARATUS FOR CONNECTING OPTICAL TRANSMISSION MODULE AND CORE POSITION DETECTION METHOD FOR OPTICAL WAVEGUIDE

(75) Inventors: Yoshihiro Onozeki, Tokyo (JP); Masaaki Kaneko, Tokyo (JP); Hitoshi Nakayama, Tokyo (JP); Masanori Gotoh, Tokyo (JP); Shinji Atsuzawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/875,203

(22) Filed: Jun. 25, 2004

(65) Prior Publication Data

US 2004/0264872 A1    Dec. 30, 2004

(30) Foreign Application Priority Data

Jun. 30, 2003    (JP) .............................. 2003-186606

(51) Int. Cl.
*G02B 6/26* (2006.01)
*G02B 6/42* (2006.01)

(52) U.S. Cl. ...................................................... 385/52
(58) Field of Classification Search ...................... None
See application file for complete search history.

(56) References Cited

U.S. PATENT DOCUMENTS 5,838,403 A * 11/1998 Jannson et al. .............. 349/65
6,299,361 B1 * 10/2001 Sasaki et al. ................. 385/59
6,594,426 B1 *  7/2003 Kwon et al. .................. 385/52
2004/0028348 A1 *  2/2004 Cote et al. .................... 385/88

FOREIGN PATENT DOCUMENTS

| JP | 3112155 | 5/1991 |
| JP | 5-313015 | 11/1993 |
| JP | 11-109176 | 4/1999 |
| JP | 2000-187131 | 7/2000 |
| JP | 2002-350667 | 12/2002 |
| JP | 2002350667 A * | 12/2002 |
| JP | 2003-121686 | 4/2003 |

* cited by examiner

*Primary Examiner*—Frank G. Font
*Assistant Examiner*—Erin Chiem
(74) *Attorney, Agent, or Firm*—Oblon, Spivak, McClelland, Maier & Neustadt, P.C.

(57) ABSTRACT

An object of the present invention is to provide an element connecting apparatus with which the position of a core of each element in an optical transmission module in a short time with high accuracy. To attain the object, in a core position detection method according to the present invention, upon detecting a core of a PLC chip, parallel light is made incident on the output side end face of the PLC chip, so that the core position is detected based on an image of the input side end face obtained with the parallel light. In addition, the core position is detected by an image of the output side end face that is obtained while parallel light is made incident on the input side end face.

8 Claims, 8 Drawing Sheets

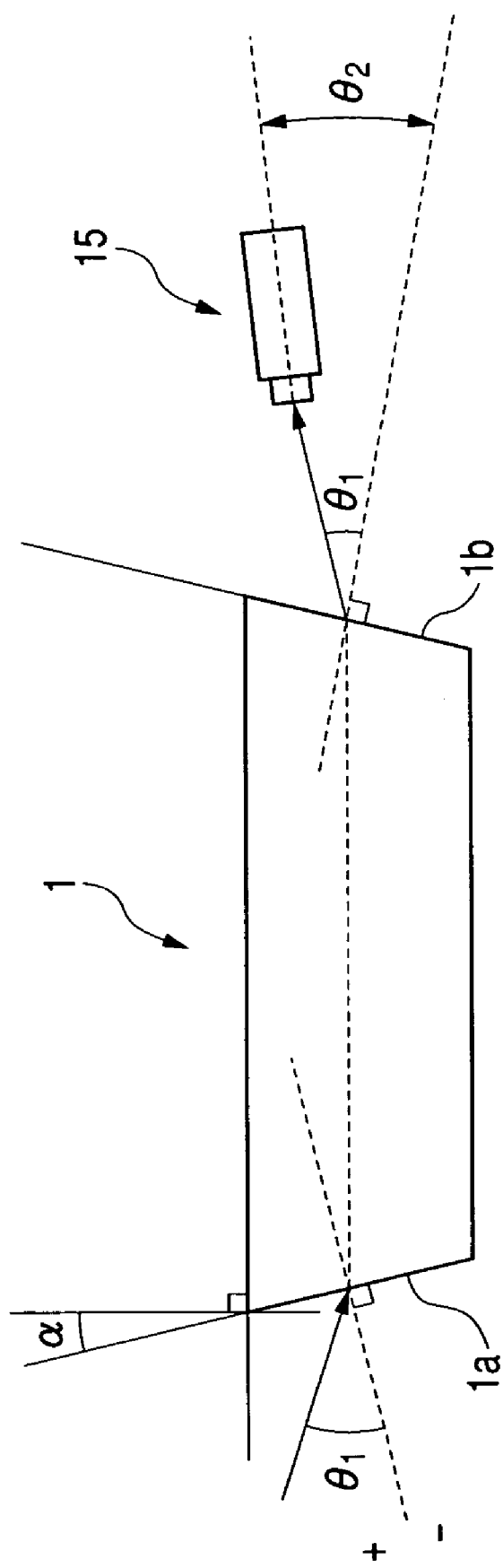

METHOD AND APPARATUS FOR CONNECTING OPTICAL TRANSMISSION MODULE AND CORE POSITION DETECTION METHOD FOR OPTICAL WAVEGUIDE

BACKGROUND OF THE INVENTION

1. Field of the Invention

The present invention relates to optical waveguides and optical fibers. More particularly, the present invention relates to a method for accurately detecting the position of a core of an optical waveguide or an optical fiber for their interconnection. The present invention also relates to a method and apparatus for aligning the cores detected by the aforementioned method and connecting those cores.

2. Related Background Art

With development of practical application of optical communication systems, improvement in the performance of optical parts used for optical communication has been required, and on the other hand reduction of the cost for producing the optical communication system is strongly required. A typical optical part used in the optical communication system is a planar lightwave circuit (which will be abbreviated as PLC hereinafter) chip. The PLC chip is produced by forming an optical circuit having various functions on a substrate. The PLC chip is used for a splitter that is adapted to receive a single optical signal and to split it into multiple optical signals. In that case, the PLC chip is connected to an optical fiber(s) on the input side and optical fibers on the output side to constitute a splitter.

Upon connecting the PLC chip and the optical fibers, it is necessary to make transmission loss related to the connection state as low as possible. Specifically, it is necessary to align a light transmitting part (which will be hereinafter referred to as a core) of the optical fiber and a light transmitting part (or a core) of the PLC chip with each other. In a conventional connecting process, the PLC chip and the input side optical fiber are roughly brought into contact with each other and an optical signal is actually made incident on the PLC chip from the input side optical fiber, so that the input side optical fiber and the PLC chip are connected in the state in which the optical output emerging from the PLC chip becomes maximum. After this connection process is completed, the PLC chip and the output side optical fiber is roughly brought into contact with each other and the optical output available at the output end of the output side optical fiber is also measured, so that the PLC chip and the output side optical fiber are connected in the state in which the optical output becomes maximum.

However, since the diameter of the optical fiber core and the diameter of the PLC chip core are smaller than 10 μm, the alignment and connection process according to the above-described method takes a significant time as large as several tens of seconds or more. In view of this, various arrangements for reducing the time required for the above-described process have been proposed as disclosed in Japanese Patent Application Laid-Open No. 2000-187131, Japanese Patent No. 3112155, Japanese Patent Application Laid-Open No. 11-109176 and Japanese Patent Application Laid-Open No. 5-313075. In one of these arrangements, for example, the above-described alignment process is carried out after rough alignment of the optical fiber and the PLC chip is performed based on their outer shape so as to reduce the time required for the above process, and in another arrangement the structure of an optical sensor is modified so that the position at which the optical output becomes maximum can be determined more efficiently with a view to reduce the time required for the above process.

Some of the aforementioned prior arts can improve the efficiency of the alignment process performed using an optical sensor. However, even the technologies of such prior arts do not show a substantial difference from other technologies in that it takes a significant time to attain a state in which an optical signal can be transmitted from the output side end of the input side optical fiber and the input side end of the PLC chip, since they utilize an optical sensor. Consequently, it is not possible to effectively reduce the actual process time by a large degree. Under such situation, in Japanese Patent Application Laid-Open No. 2002-350667 or Japanese Patent Application Laid-Open No. 2003-121686, there is disclosed a method of realizing the above-described transmissive state by detecting the position of the core of the optical fiber and a core of the PLC chip based on an image.

In the technology disclosed in Japanese Patent Application Laid-Open No. 2002-350667, cameras are provided at positions opposed to the output end portion of the input side optical fiber, the input end portion of the PLC chip, the output end portion of the PLC chip and the input end portion of the output side optical fiber respectively, and images of the respective end portions are taken by the cameras so that the position of the respective cores at the end portions are detected. In addition, this prior art document teaches to inputting an optical signal to the end portion different from the end portion to be imaged upon taking an image of the optical fiber core and to introduce illumination light from the end portion of the PLC chip different from the end portion to be imaged, in order to make the imaging (or image-taking) process easy.

However, the refractive index of the core of a PLC chip differs from the refractive index of the substrate on which the core and cladding (including over cladding and base cladding) are formed by only 1% or less. In other words, the substrate itself is also transparent to light, and therefore it is very difficult to determine the shape of the core clearly only by taking an image of the end portion with a camera. In addition, even when a transparent object having little refractive index difference is illuminated with light from the direction opposite to the camera, it is considered difficult to make the boundary of materials having different refractive indices clearly visible. Furthermore, the connection end portion of an optical fiber is generally provided with a connection terminal made of a cladding structure. In many cases, this structure is substantially the same as the connection portion of the PLC chip with the input side optical fiber. In that case, it is considered difficult to determine clear shape of the core at that end portion only by guiding the transmitted light.

In view of the fact that it is difficult to determine the shape of the core by simple illumination with light, Japanese Patent Application Laid-Open No. 2003-121686 discloses how the shape of the core can be obtained. Specifically, it teaches to irradiate the end face or the like of an optical fiber by polarized light and observe the reflected light by means of a polarization microscope to make visualization of the core shape possible. However, in this arrangement, the polarization microscope is indispensable, and therefore if an apparatus for automatically connecting a PLC chip and an optical fiber is to be produced, an increase in the size and cost of the apparatus is inevitable. In addition, in the arrangement disclosed in this prior art, it is necessary to construct the apparatus in such a way that each of a stage on which the optical fiber is fixed and a stage on which the PLC chip is fixed can be driven in X, Y, Z and θ direction. In such a structure that includes many movable portions that are required to be driven always, there is a risk that positional displacement can occur in the process of actually connecting the optical fiber and the PLC chip due to stoppage error of the driven portions.

SUMMARY OF THE INVENTION

The present invention has been made in view of demands placed on the above-described prior arts. An object of the present invention is to provide a method for easily detecting the shape or position of a core of a PLC chip or the like and to provide a method and apparatus for connecting an optical fiber and a PLC chip easily, reliably and swiftly by using the above method.

According to the present invention that is intended to attain the above object, there is provided an optical transmission module connecting method for performing alignment of an input side optical fiber array, an optical transmission element including at least one of a lower substrate, a core, a cladding, an adhesive layer and an upper substrate in the interior thereof and an output side optical fiber array, and connecting their cores, comprising a step of making substantially parallel light incident on an output side end face of said optical transmission element and taking an image of an input side end face of said optical transmission element to detect the position of the core at said input side end face, a step of making substantially parallel light incident on said input side end face of said optical transmission element and taking an image of said output side end face to detect the position of the core at said output side end face, a step of detecting the position of a core of said input side fiber array and a core of said output side fiber array at their respective connection portions, and a step of positioning the core of said input side fiber array at its connection portion and the core of said optical transmission element at its input side end face, and the core of said optical transmission element at its output side end face and the core of said output side fiber array at its connection portion respectively.

In the above-described method, it is preferable that the incidence angle at which said substantially parallel light is incident on said input side end face and said output side end face of said optical transmission element be such that said substantially parallel light introduced into the interior of said optical transmission element is totally reflected at least either one of boundary surfaces of the lower substrate, the core, the cladding, the adhesive layer and the upper substrate. Furthermore, in the above-described method, it is preferable that upon taking an image of said input side end face or said output side end face of said optical transmission element, a camera used for the image taking be adapted to take an image of the end faces in a state in which the camera is inclined with respect to said input side end face or said output side end face at a predetermined angle. Still further, in the above-described method, it is preferable that in the step of detecting the position of the core of the input side fiber array and said output side fiber array at their connection portion, light be introduced from an end portion other than said connection portion, and an operation of detecting the brightest portion in a light image observed at said connection portion as the center of said core be performed.

According to another aspect of the present invention that is intended to attain the aforementioned object, there is provided an optical transmission module connecting apparatus for performing alignment of an input side optical fiber array, an optical transmission element including at least one of a lower substrate, a core, a cladding, an adhesive layer and an upper substrate in the interior thereof and an output side optical fiber array, and connecting their cores, comprising a chip support table for supporting said optical transmission element, an input side array support table for supporting said input side fiber array, an output side array support table for supporting said output side fiber array, a first light source for launching substantially parallel light into the interior of said optical transmission element from an output side end face of said optical transmission element, a first camera for taking an image of an input side end face of said optical transmission element revealed by said substantially parallel light emitted from said first light source, a second light source for launching substantially parallel light into the interior of said optical transmission element from said input side end face of said optical transmission element, a second camera for taking an image of said output side end face of said optical transmission element revealed by said substantially parallel light emitted from said second light source, a third camera for taking an image of an end face of said input side fiber array, a fourth camera for taking an image of an end face of said output side fiber array, and driving means for driving said input side array support table, said chip support table and said output side array support table based on a result of the image taking by said first to fourth cameras.

In the above-described apparatus, it is preferable that said first light source be adapted to launch the substantially parallel light into the interior of said optical transmission element from said output side end face at such an angle with which said substantially parallel light is totally reflected at least either one of boundary surfaces of said lower substrate, the core, the cladding, the adhesive layer and the upper substrate in the interior of said optical transmission element, and that said second light source be adapted to launch the substantially parallel light into the interior of said optical transmission element from said input side end face at such an angle with which said substantially parallel light is totally reflected at least either one of boundary surfaces of said lower substrate, the core, the cladding, the adhesive layer and the upper substrate in the interior of said optical transmission element. Furthermore, in the above-described apparatus, it is preferable that said first camera be disposed obliquely with respect to said input side end face of said optical transmission element at a predetermined angle and said second camera be disposed obliquely with respect to said output side end face of said optical transmission element at a predetermined angle. Still further, in the above-described apparatus, it is preferable that in a process of detecting the position of a core of the input side fiber array at its connection portion, light be introduced from an end portion other than said connection portion, and said third camera be adapted to detect the brightest portion in a light image observed at said connection portion as the center of said core, and that in a process of detecting the position of a core of the output side fiber array at its connection portion, light be introduced from an end portion other than said connection portion, and said fourth camera be adapted to detect the brightest portion in a light image observed at said connection portion as the center of said core.

According to a still other aspect of the present invention that is intended to attain the aforementioned object, there is provided a method of detecting the position of a core in an optical waveguide including a lower substrate, the core, a cladding, an adhesive layer and an upper substrate in the interior thereof, comprising a step of making substantially parallel light incident on an output side end face of said optical waveguide in a condition that the substantially parallel light is totally reflected by at least either one of boundary surfaces of the lower substrate, the core, the cladding, the adhesive layer and the upper substrate, a step of taking an image of the core at an input side end face of said optical waveguide revealed by said substantially parallel light by means of a first camera to detect the position of the core, a step of making substantially parallel light incident on the input side end face of said optical waveguide in a condition that the substantially parallel light is totally reflected by at least either one of the boundary surfaces of the lower substrate, the core, the cladding, the adhesive layer and the upper substrate, and a step of taking an image of the core at the output side end face of said optical waveguide revealed by said substantially parallel light by means of a second camera to detect the position of the core.

In the above-described method, it is preferable that the condition for the total reflection be that the substantially parallel light is incident on at least either one of the boundary surfaces of the lower substrate, the core, the cladding, the adhesive layer and the upper substrate at an angle in the range of ±5°. Furthermore, in the above-described method, it is preferable that the first camera and the second camera be disposed obliquely relative to such an incident angle of the substantially parallel light entering into the interior of the optical waveguide with which the substantially parallel light will travel in parallel to at least either one of the boundary surfaces of the lower substrate, the core, the cladding, the adhesive layer and the upper substrate, at an angle in the range of ±10°.

BRIEF DESCRIPTION OF THE DRAWINGS

FIG. 3 is a diagram illustrating the incidence angle of parallel light incident on the PLC chip.

DETAILED DESCRIPTION OF THE PREFERRED EMBODIMENTS

Figure 1A:
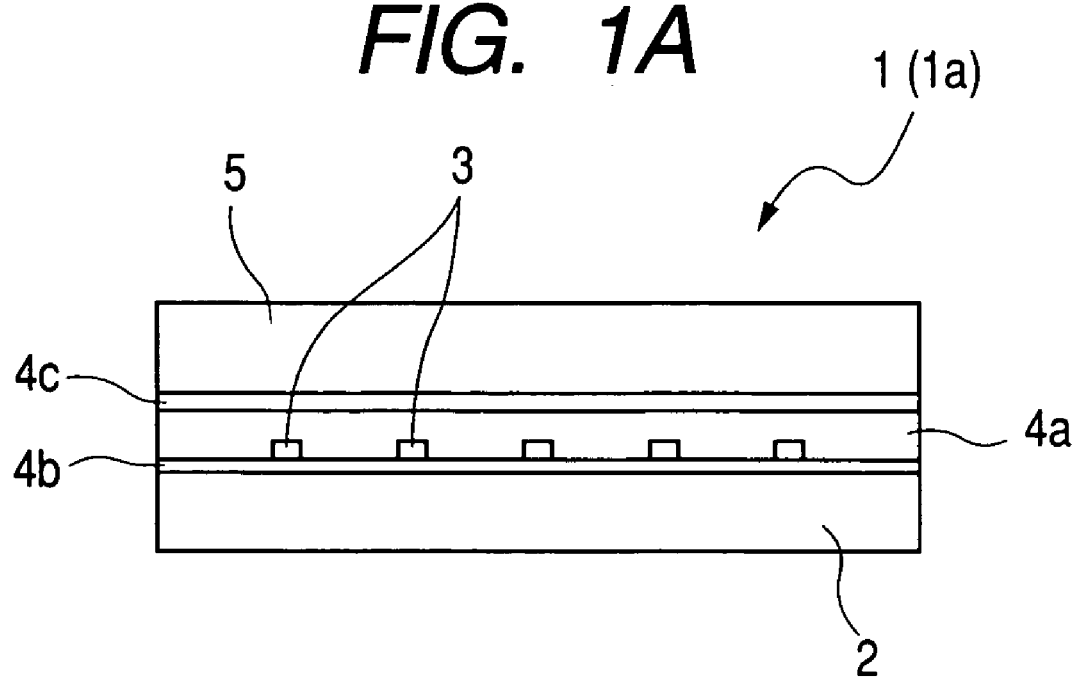
FIG. 1A schematically shows a cross section of a PLC chip taken in the direction perpendicular to the light transmission direction.
Figure 1B:
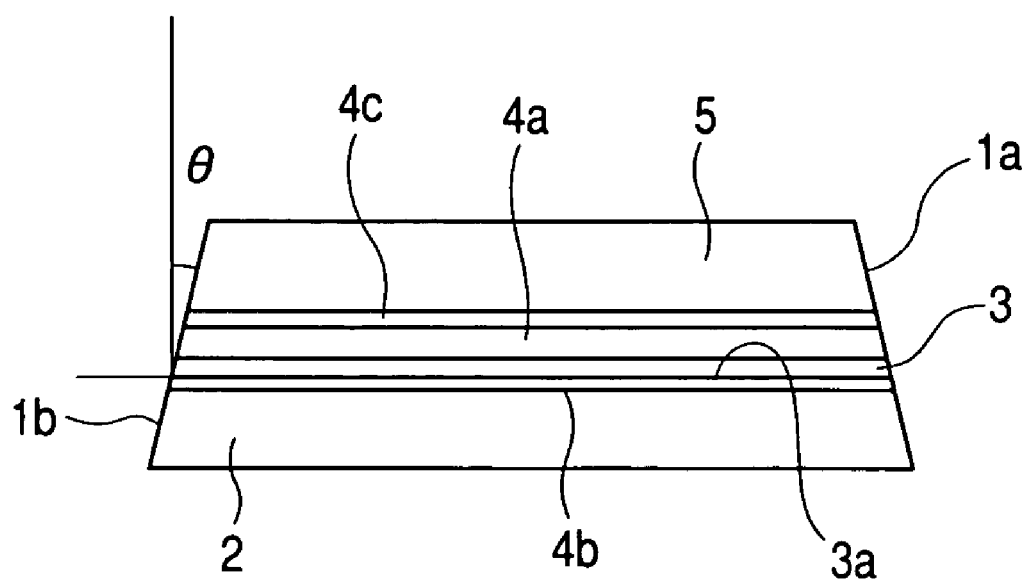
FIG. 1B schematically shows a cross section of the PLC chip taken in the direction parallel to the light transmission direction.
Figure 2A:
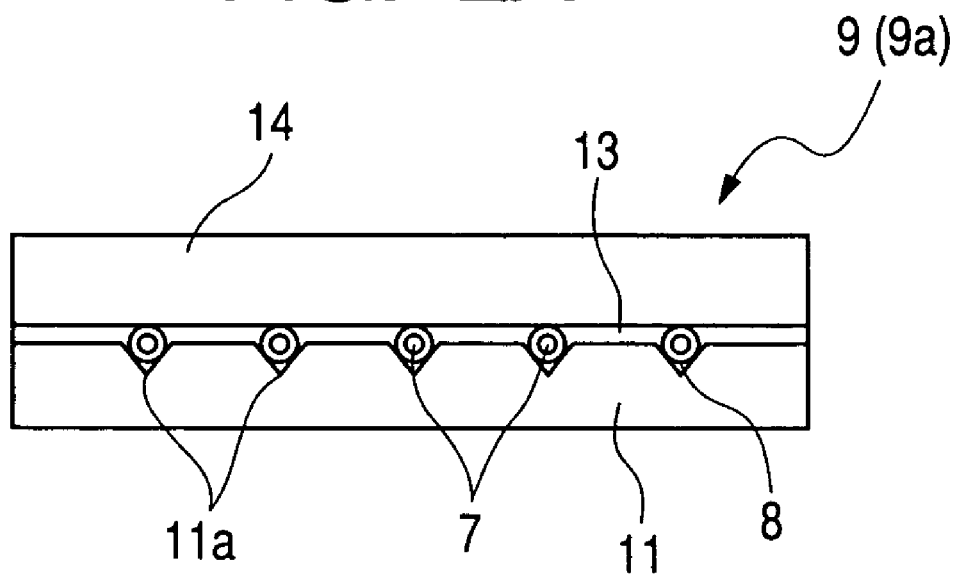
FIG. 2A schematically shows a cross section of an end portion of a fiber array taken in the direction perpendicular to the light transmission direction.
Figure 2B:
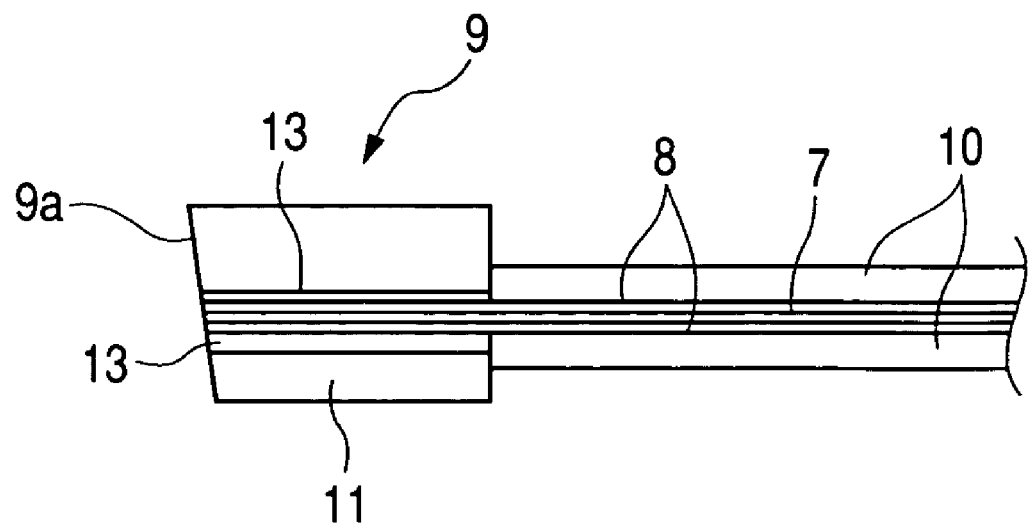
FIG. 2B schematically shows a cross section of the end portion of the fiber array taken in the direction parallel to the light transmission direction.

FIGS. 1A and 1B show a PLC chip, for which image taking of the core shape is to be carried out in accordance with the present invention. Specifically, FIG. 1A shows the outline of the PLC chip at its end face to which input/output optical fibers are to be connected, and FIG. 1B shows the outline of the PLC chip in a longitudinal cross section. FIGS. 2A and 2B show the input/output optical fibers. FIG. 2A shows the outline of the end face of the optical fibers to be connected to the PLC chip as seen from the front side, and FIG. 2B shows the outline of the connection end portion of the optical fiber in a longitudinal cross section. The PLC chip 1 used in this embodiment is composed of a lower substrate 2, a base cladding 4b disposed on the lower substrate, PLC cores 3 functioning as optical waveguides formed on the base cladding 4b, an over cladding 4a formed to cover the optical waveguides 3, an upper substrate provided as the uppermost layer and an adhesive layer 4c for bonding the over cladding 4a and the upper substrate 5. The end faces 1a of the PLC chip is slanted by a certain angle θ relative to the plane perpendicular to the plane 3a on which the cores 3 are formed.

The optical fiber 6 is composed of a fiber core 7 serving as an optical waveguide, a cladding 8 disposed around the fiber core 7 and a coating 10. Since it is difficult to connect the end face of the optical fiber 6 having the above described form with a PLC chip or the like, a connection member 9 is attached to the end face of the optical fiber 6. The connection member 9 has the structure substantially the same as the PLC chip, namely, the connection member 9 is composed of a lower substrate 11, a fiber core 7, an adhesive layer 13 and an upper substrate 14. On the lower substrate 11, grooves 11a corresponding to the paths of the optical waveguides are formed. The fiber cores 7 with the cladding 8 from which the coating has been removed are received in the grooves 11a. The fiber cores 7 with the cladding 8 in this state are sandwiched between the lower substrate 11 and the upper substrate 14 and the space formed between the substrates is filled with an adhesive layer 13.

As described before, the lower substrate 2, the core 3, the over cladding 4a, the base cladding 4b and the upper substrate 5 have refractive indices very close to each other. Consequently, it is difficult to find the shape or the position of the core 3 by observing the end face 1a of the PLC chip by taking an image of the end face, as described before. In addition, even if light is introduced into the PLC chip from the end face 1b of the PLC chip opposite to the surface to be photographed as disclosed in the aforementioned Japanese Patent Application Laid-Open No. 2002-350667, it is considered difficult to make the contrast of the core 3 and the other parts clear. Presumably, the reason is that since the aforementioned parts have substantially the same refractive indices and substantially the same light transmission properties, the transmitted light will have the opposite effect of blurring the boundary of parts.

In this embodiment, with a view to prevent the above-described situation from occurring, all of the light made incident on the end face 1b of the PLC chip is arranged to be parallel light (fully parallel light, preferably). In the case that parallel light is made incident on the end face 1b, the light will be refracted or reflected among the parts while always keeping a specific angle. Consequently, the states of resultant transmitted light will differ in accordance with the difference in the refractive indices of the respective parts. Thus, it is possible to recognize the positional configuration of each part by detecting the above-mentioned difference with appropriate means.

In this embodiment, parallel light is made incident on the end face 1b of the PLC chip 1 in the state that the parallel light is totally reflected, for example, at the boundary surface between the over cladding 4a and the adhesive layer 4c, the boundary surface between the base cladding 4b and the over cladding 4a (which will be collectively referred to as cladding) and the boundary surface between the adhesive layer 4c and the upper substrate 5. If parallel light is guided to the PLC chip with the above conditions being met, no parallel light emerges from the neighborhood of the base cladding 4b, the over cladding 4a and the cores 3 at the end face 1a. Consequently, the aforementioned boundary surfaces can be easily imaged as contrast, and the position of the core 3 can be easily detected by normal binarization processing. In connection with the above, the condition such as an angle condition for obtaining total reflection depends on the wavelength of the parallel light, the refractive index of the parts etc. as a matter of course. Here, the parallel light is not fully parallel light, but nearly parallel light that can be formed easily using a light source and lenses. However, it is preferable that the light made close to fully parallel light in order to obtain more clear contrast image.

The inventors of the present invention conducted an investigation in order to find how the core image can be obtained. In the following, a result of the investigation will be described. In FIG. 3, various parameters used in the investigation are shown. The angle formed by the end face 1a of the PLC chip 1 on which the optical signal is incident and a plane parallel to the waveguides in the PLC chip is referred to as the end face angle cz and the angle formed by a line orthogonal to the end face 1a and the direction of the parallel light incident on the end face 1a is referred to as the incidence angle $\theta_1$. In addition, the angle formed by a line orthogonal to the light emergence side end face 1b of the PLC chip 1 and the direction of the camera 15 for imaging the light emerging from the end face 1b is represented by $\theta_2$. Here, the end face angle α is equal to the aforementioned angle θ.

Figure 4:
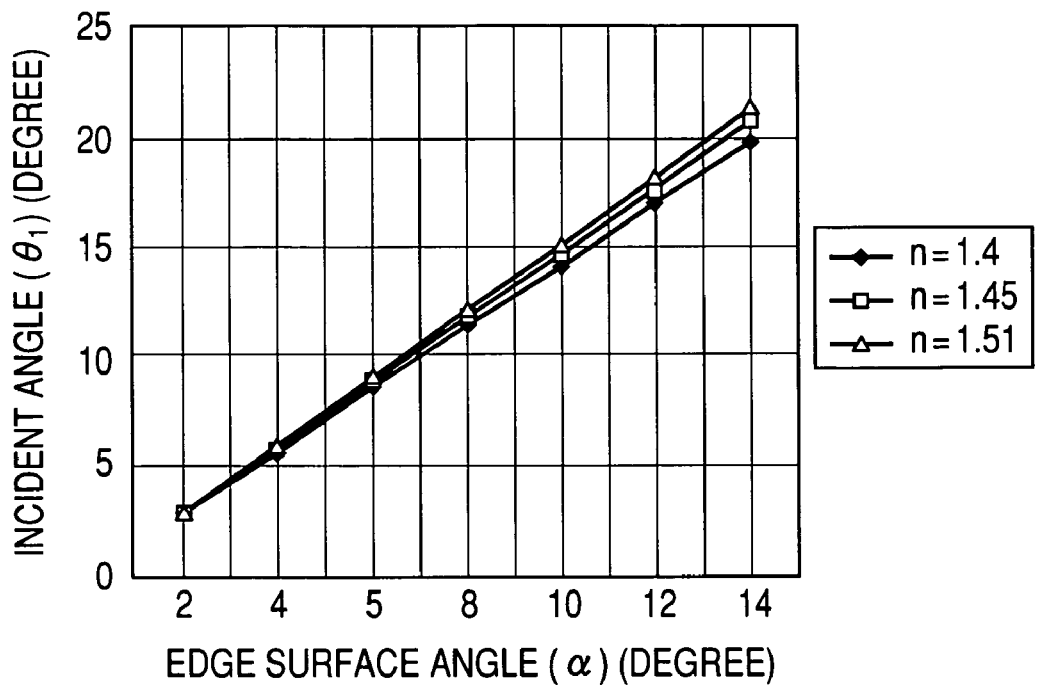
FIG. 4 is a graph showing the relationship between the inclination angle of an end face of a PLC chip and the incidence angle of parallel light.

In order to obtain the above-mentioned total reflection conditions for the incident parallel light, it is firstly necessary to find the condition that allows the parallel light entering into the interior of the PLC chip to be transmitted substantially parallel to the adhesive layer. FIG. 4 shows the incidence angle of the parallel light that meets the condition. It will be understood that the incidence angle is determined uniquely depending on the refractive index of the part that transmits the light and the end face angle.

Figure 5:
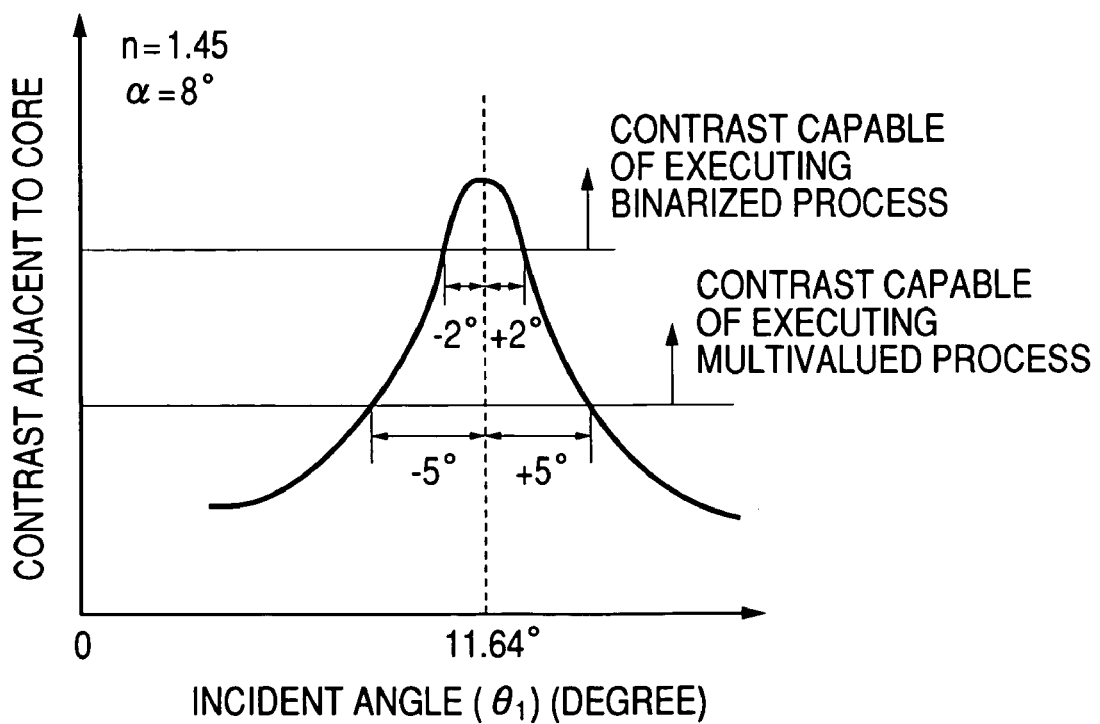
FIG. 5 is a graph showing the relationship between the incidence angle of parallel light and the contrast of obtained images.

FIG. 5 shows the result of an investigation in which the incidence angle was varied with the center being at the angle of 11.64° selected based on the relation shown in FIG. 4 and the light emerging from the emergence side end face 1b was analyzed to determine the light and shade contrast of an image of the core or the area in the vicinity of the core. As shown in FIG. 5, within the range of ±5° from the center at incidence angle 11.64°, it is possible to determine the shape of the core by value multiplexing, or, if circumstances allow, by ordinary binarization processing. In addition, within the range of ±2° from the center incidence angle 11.64°, it is possible to determine the shape of the core by ordinary binarization processing.

Figure 6:
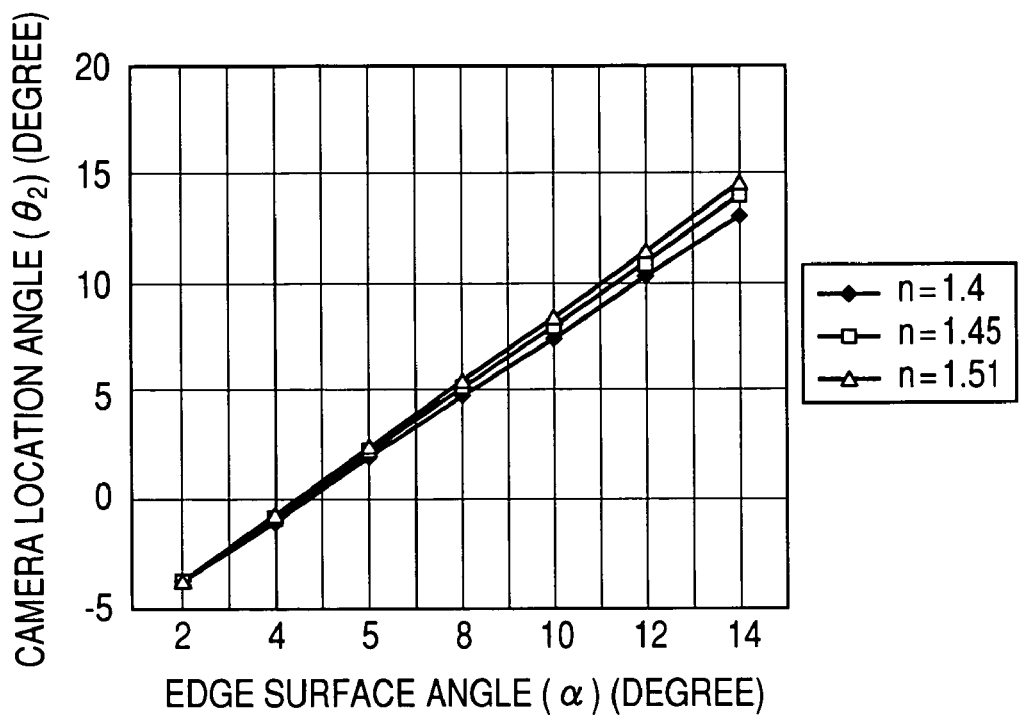
FIG. 6 is a graph showing the relationship between the inclination angle of an end face of a PLC chip and the inclination angle of a camera.

In connection with the above, the shade portion in the light and shade contrast in the vicinity of the core is generated as a result of absence of light emitted from the corresponding portion incident on the camera. However, in some cases it is considered that shade portion cannot be detected depending on the position of the camera due to light that has directly passed through a portion in the PLC chip 1 that is made of a different material. In view of this, the condition with which an light and shade contrast image can be obtained based on parallel light when the parallel light parallel to the plane in the PLC chip on which the waveguides are formed is emitted from the end face 1b was determined. The result is shown in FIG. 6. From this result, it will be understood that a contrast image of the area in the vicinity of the core can be obtained by giving an offset of 6.7° for the camera disposition angle from light incident angle.

Figure 7:
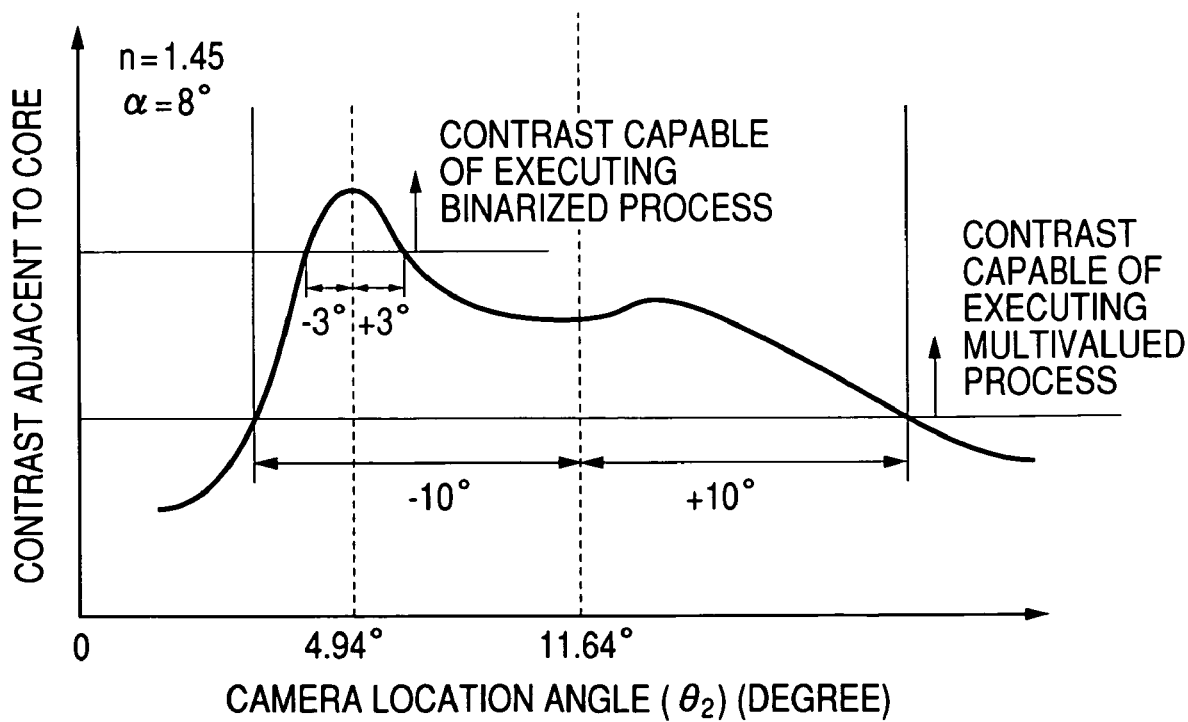
FIG. 7 is a graph showing the relationship between the inclination angle of the camera and the contrast of obtained images.

FIG. 7 shows the result of an investigation in which the disposition angle (or the orientation) of the camera was varied with the center being at 11.64°, which is the presumed center of the incidence angle of the parallel light, and the light emerging from the emergence side end face 1b was analyzed to determine the light and shade contrast of an image of the core or the area in the vicinity of the core. As shown in FIG. 7, within the range of ±10° from the camera disposition angle of 11.64°, it is possible to determine the shape of the core by value multiplexing, or, if circumstances allow, by ordinary binarization processing. In addition, within the range of ±3° from the camera disposition angle 4.94°, it is possible to determine the shape of the core by ordinary binarization processing.

As will be seen from FIG. 7, the more preferable center of the angle range is 4.94°, namely, the center is shifted from the central angle of 11.64° by the offset angle that was mentioned above in connection with FIG. 6. In addition, the peak value appeared only on one side of the central angle. Presumably, the reason is that when the light is incident in favorable conditions, the total reflection condition is met between the adhesive layer and the over cladding and light scarcely reaches the upper substrate side. In addition, it is considered that the reason why a minimum value appeared in FIG. 7 is that large amount of light that entered portions other than the core is emitted. Therefore, it is considered that the degree of freedom of camera disposition can be increased by using fully parallel light.

In view of the result of the above investigations, it was found that in order to obtain an image of the core, parallel light should be made incident on the end face 1a at an angle within the range of ±5°, and more preferably ±2° from the incidence angle with which the parallel light having passed through the end face becomes parallel to the plane in the PLC chip on which the waveguides are formed. In addition, it was also found that in order to obtain an image of the core using light emerging from the end face 1b, the camera should be obliquely disposed at an angle within the range of ±10° from the incidence angle with which the parallel light having passed through the end face becomes parallel to the plane in the PLC chip on which the waveguides are formed, and more preferably an angle within the range of ±3° from the center at an angle of 4.94°, which is the angle offset from the above incidence angle by about 6.7°.

It is considered sufficient that the total reflection condition be met at either one of the boundary surfaces of the lower substrate, the core, the base cladding, the over cladding, the adhesive layer and the upper substrate. Although a PLC chip including the above-mentioned parts is picked up an example to which the present invention is applied, the present invention can be applied to a chip including some of the above-described parts, and it is considered that the advantageous effects of the present invention can also be realized if the aforementioned conditions are met at either one of the boundary surfaces of those parts. In addition, the above condition concerning camera may be interpreted as that the camera is inclined by a certain angle relative to an end face of the PLC chip.

The above investigation was made on a PLC chip that is formed using a quartz-based material as a substrate. As will be apparently understood from FIG. 4, it is considered that the result of the investigation does not depend on the refractive indices of the parts so much. However, it is preferable that the aforementioned conditional ranges be modified fitly depending on the material. The wavelength of the parallel light used here is in the range of 500 to 700 nm. As is well known, the refractive index depends on the wavelength. Therefore, it is preferable that the aforementioned conditional ranges be modified fitly depending on the wavelength of the light used.

In Japanese Patent Application Laid-Open No. 2002-350667, it is described to the effect that the position of a core 12 can be detected by simply taking an image of a connection end face 9a. However, it is difficult to visualize the shape of the core 12 as clearly as in the above-described embodiment only by guiding light into an optical fiber. Therefore, the above-described method of detecting the position of the core 3 in the PLC chip 1 can be effectively applied to a connection end member 9 of an optical fiber. However, it is practically difficult to keep the parallel state of the light that has passed through an optical fiber. Consequently, from the practical point of view, the most effective method is to determine the core position at the connection member 9 based on the intensity distribution of the light emerging from the connection end face 9a.

Figure 8:
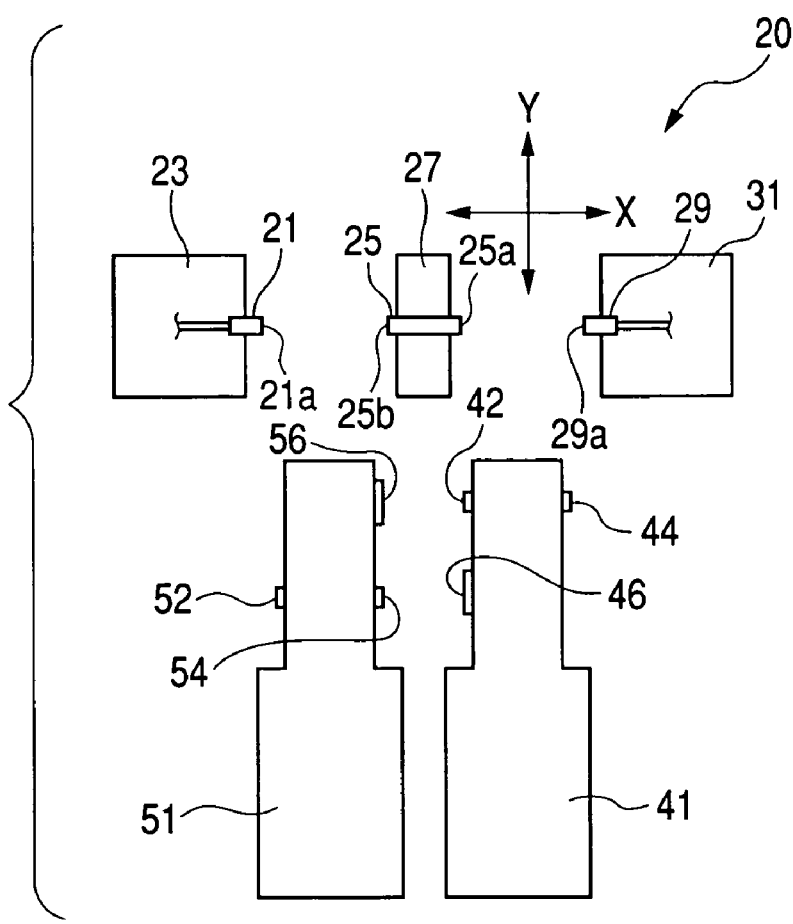
FIG. 8 schematically shows the outline of an optical transmission module according to an embodiment of the present invention as seen from above.

In the following, a connecting apparatus that embodies the present invention for aligning and connecting a PLC chip and an optical fiber will be described in the following. This connecting apparatus utilizes the above-described method of detecting the core position in an PLC chip. FIG. 8 shows the basic structure of a connecting apparatus according to the present invention, namely a connecting apparatus for optical transmission modules, as seen form above. As shown in FIG. 8, the principal components of the connecting apparatus 20 include an input side array support table 23 for supporting an input side fiber array 21, a chip support table 27 for supporting a PLC chip 25, an output side array support table 31 for supporting an output side fiber array 29, a first two viewing field camera 41 and a second two viewing field camera.

The input side array support table 23 and the output side array support table 31 can be moved toward and away from each other along the X axis indicated in FIG. 8 with the chip support table being at the center. In addition, the position of each table and each camera can be adjusted along the X and Y axes indicated in FIG. 8 and Z axis that is orthogonal to the X and Y axes, if need be. Angular position of these parts can also be adjusted about the X, Y and Z axes. Since various know mechanisms may be used as the mechanism for adjusting the position and angular position of these parts, the description of the mechanism will be omitted. In the structure and operation described in the following, radiation of light from a light source and image-taking of each end face with the cameras are performed while satisfying the above-described conditions. The description concerning those conditions will be omitted in the following in order to avoid complication of description.

The first two viewing field camera 41 has two cameras 42 and 44, which are oriented to the directions opposite to each other on the X axis (oriented outwardly from the body of the two viewing field camera 41). The first two viewing field camera 41 is adapted to be moved in the Y axis direction so that it can be positioned between the chip support table 27 and the output side array support table 31 in the state in which the chip support table 27 and the output side array support table 31 are spaced apart from each other in the X axis direction. The aforementioned cameras 42 and 44 are disposed at the respective positions at which they can take images of the output side end face 25a of the PLC chip 25 and the input side end face 29a of the output side fiber array 29 supported by the respective tables 27 and 31 when the two viewing field camera 41 is positioned between the tables 27 and 31. The first two viewing field camera 41 also has a light source 46 that can radiate parallel light to the output side end face 25a of the PLC chip 25 in the state in which the camera 41 is shifted in the Y axis direction by a predetermined amount. The light source 46 is oriented in the same direction as the camera 42 with respect to the X axis direction and disposed at the level same as the camera 42 with respect to the Z axis direction. The light source 46 is mounted and held in such a way that the emitting direction of the parallel light can be changed.

The second two viewing field camera 51 has two cameras 52 and 54, which are oriented to the directions opposite to each other on the X axis (oriented outwardly from the body of the two viewing field camera 51). The second two viewing field camera 51 is adapted to be moved in the Y axis direction so that it can be positioned between the input side array support table 23 and the chip support table 27 in the state in which the input side array support table 23 and the chip support table 27 are spaced apart from each other in the X axis direction. The aforementioned cameras 52 and 54 are disposed at the respective positions at which they can taking images of the output side end face 21a of the input side fiber array 21 the input side end face 25b of the PLC chip 25 supported by the respective tables 23 and 27 when the two viewing field camera 41 is positioned between the tables 27 and 31. The second two viewing field camera 51 also has a light source 56 that can radiate parallel light to the input side end face 25b of the PLC chip 25 in the state in which the camera 51 is shifted in the Y axis direction by a predetermined amount. The light source 56 is oriented in the same direction as the camera 54 with respect to the X axis direction and disposed at the level same as the camera 54 with respect to the Z axis direction. The light source 56 is mounted and held in such a way that the emitting direction of the parallel light can be changed.

The cameras 42, 44, 52 and 54 correspond to the second camera, the fourth camera, the first camera and the third camera recited in the claims respectively. The light sources 46 and 56 correspond to the first light source and the second light source recited in the claims respectively. The driving apparatuses for the tables are collectively referred to as driving means.

Figure 9:
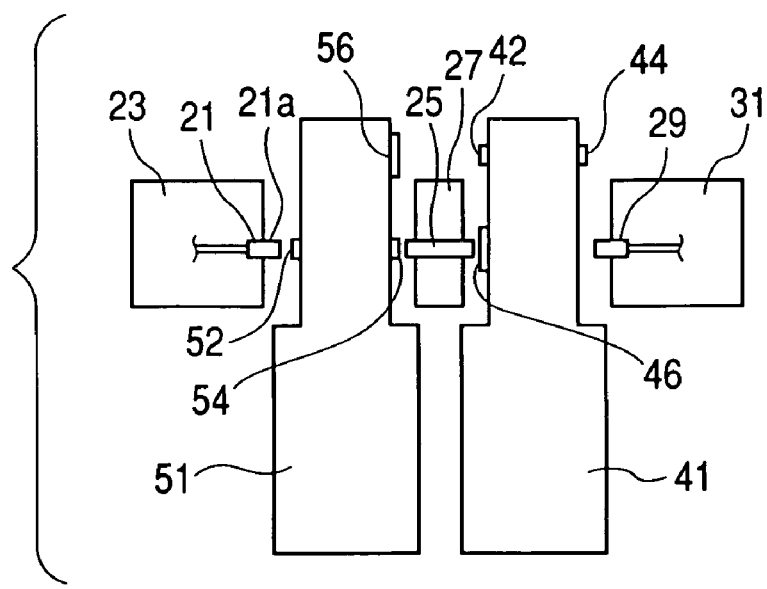
FIG. 9 schematically shows the outline of the optical transmission module according to the embodiment of the present invention as seen from above.
Figure 10:
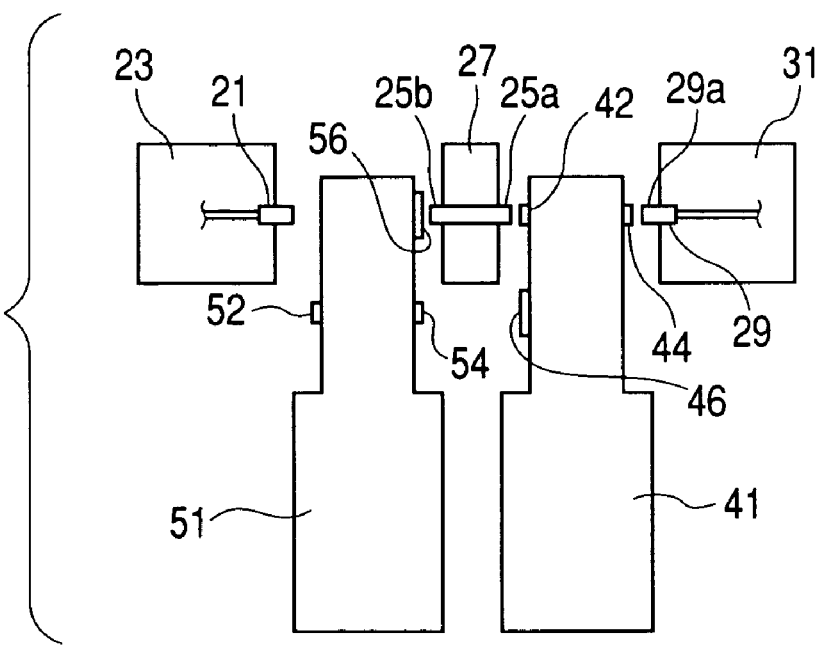
FIG. 10 schematically shows the outline of the optical transmission module according to the embodiment of the present invention as seen from above.
Figure 11:
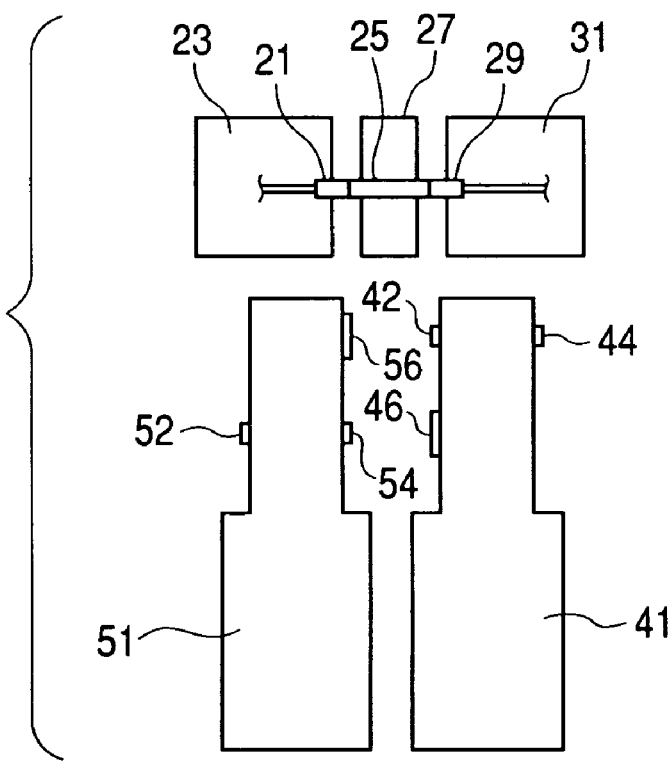
FIG. 11 schematically shows the outline of the optical transmission module according to the embodiment of the present invention as seen from above.

Next, the process of aligning and connecting the PLC chip 25 and the optical fiber arrays 21, 29 using the connecting apparatus 20 will be described with reference to FIGS. 9 to 11. FIGS. 9 to 11 show the apparatus 20 in the manner same as FIG. 8, in various stages of the aligning and connecting process. Firstly, the PLC chip 25, the input side fiber array 21, the output side fiber array 29 are supported by the respective tables. In this state, the input side array support table 23 and the output side array support table 31 are disposed in a state in which they are spaced apart by a predetermined distance from each other with the chip supporting table 27 being at the center.

Subsequently, the first two viewing field camera 41 and the second two viewing field camera 51 are inserted between the respective spaces between the tables 23, 27 and 31 and stopped at the first position. In this state, the camera 52 of the second two viewing field camera 51 is opposed to the output side end face 21*a* of the input side fiber array 21 and the camera 54 of the second two viewing field camera 51 is opposed to the input side end face 25*b* of the PLC chip 25. In addition, light source 46 of the first two viewing field camera 41 is opposed to the output side end face 25*a* of the PLC chip 25 so that it can launch parallel light into the interior of the PLC chip 25 at a prescribed condition.

In this state, signal light of the like is introduced into the input side fiber array 21 and the output side end face 21*a* thereof is photographed by the camera 52. Actually, it is considered difficult to photograph or detect the core of the connection member (not shown) attached to the end of the fiber array 21. In this embodiment, a so-called light source image emerging from the output side end face 21*a* is photographed and the center of brightness (the brightest position in illuminated region) in that image is determined to be the center of the core. According to this method, although the center of the core is not determined based on its shape, the position on the output side end face 21*a* at which light transmission efficiency is practically maximum can be determined. Thus, the actual center of the core can be determined. A favorable connection state can be realized by connecting the core of the PLC chip 25 with the determined position.

Simultaneously, parallel light is radiated from the light source 46 of the first two viewing field camera 41 to the output side surface 25*a* of the PLC chip 25 while the above-mentioned total reflection condition is met. With the radiation of the parallel light, the shape and position of the core and other parts are visualized as a gradation image on the input side end face 25*b*. This gradation image is photographed by the camera 54. The picked up image is subjected to binarization or like processing by an image processing circuit or the like (not shown), so that the shape and position of the core and other parts can be detected. As described before, the cameras 52 and 54 pick up images having the same central axis. Therefore, it is possible to determine the positional relationship of members disposed in different viewing fields uniquely based on images obtained by the respective cameras. Thus, it is possible to perform the alignment of the center of the signal (according to the brightest position) at the output side end face 21*a* of the input side fiber array 21 detected by the camera 52 and the center of the core on the input side end face of the PLC chip 25 easily and reliably.

After the aligning operation is completed, the first and second two viewing field cameras 41 and 51 are moved back from the first position shown in FIG. 9 and stopped at the second position (the predetermined position mentioned before). This state is shown in FIG. 10. In this state, the camera 44 of the first two viewing field camera 41 is opposed to the input side end face 29*a* of the output side fiber array 29, and the camera 42 is opposed to the output side end face 25*a* of the PLC chip 25. In addition, the light source 56 of the second two viewing field camera 51 is opposed to the input side end face 25*b* of the PLC chip 25 so that it can launch parallel light into the interior of the PLC chip 25 at a prescribed condition.

In this state, signal light or the like is introduced into the output side fiber array 29 from the end portion other than the connection portion and an image of the input side end face 29*a* of the output side fiber array 29 is taken by the camera 44. This photographing operation is the same as the above-described photographing operation for the output side end face 21*a* of the input side fiber array 21, and the description thereof will be omitted. Simultaneously, parallel light is radiated from the light source 56 of the second two viewing field camera 51 to the input side end face 25*b* of the PLC chip 25 while the above-mentioned total reflection condition is met. With the radiation of the parallel light, the shape and position of the core and other parts are visualized as a gradation image on the output side end face 25*a*. This gradation image is photographed by the camera 43. The picked up image is subjected to binarization or like processing by an image processing circuit or the like (not shown), so that the shape and position of the core and other parts can be detected. With the above-described operation, alignment of the center of the signal at the input side end face 29*a* of the output side fiber array 29 and the center of the core formed on the output side end face of the PLC chip 25 is completed. As per the above, by carrying out the present invention, it is possible to perform aligning operations called rough alignment and mid alignment at one time, and it is possible to reduce positional displacement of the cores of the members down to the order of several microns.

After the above-described operation is completed, the first and the second two viewing field cameras 41 and 51 are moved back to their original position shown in FIG. 8. After that, the input side array support table 23 and the output side array support table 31 are moved close to the chip support table 27. In the configuration shown in FIG. 11, the input side fiber array 21, the PLC chip 25 and the output side fiber array 29 are in the almost connected state. In this state, signal light is introduced into the input side fiber array 21, and fine adjustment of the connecting position of the input side fiber array 21 and the PLC chip 25 is carried out based on the intensity of the optical signal obtained from the output side fiber array 29. After this fine adjustment is finished, fine adjustment of the connecting position of the PLC chip 25 and the output side fiber array 29 is carried out based on the optical signal intensity in the same state. After these fine adjustment operations are finished, the process of filling spaces between the members with adhesive or the like to fix and connect the members is carried out.

By carrying out the above-described fine alignment operation, it is possible to reduce positional displacement of the cores of the individual members down to the order of sub-microns. The position detection of the core is performed based on an analysis of an image obtained by a camera, and the time required for the analysis is less than a few seconds even if the time required for the actual alignment operation is included. Therefore, by carrying out the present invention, it is possible to manufacture an optical transmission module in a time shorter than in the conventional method with extremely high accuracy.

In this embodiment, a pair of two viewing field cameras are used to simultaneously photograph the core of the input side fiber array and the input side core of the PLC chip, and the output side core of-the PLC chip and the core of the output side fiber array respectively. However, this embodiment may be modified in the manner shown in FIG. 12. In the following, the principal parts of a modification of the connecting apparatus for optical transmission module will be described with reference to FIG. 12 that shows the parts as seen from above. In the following description, the parts similar to those in FIG. 8 will be designated by the same reference signs.

Figure 12:
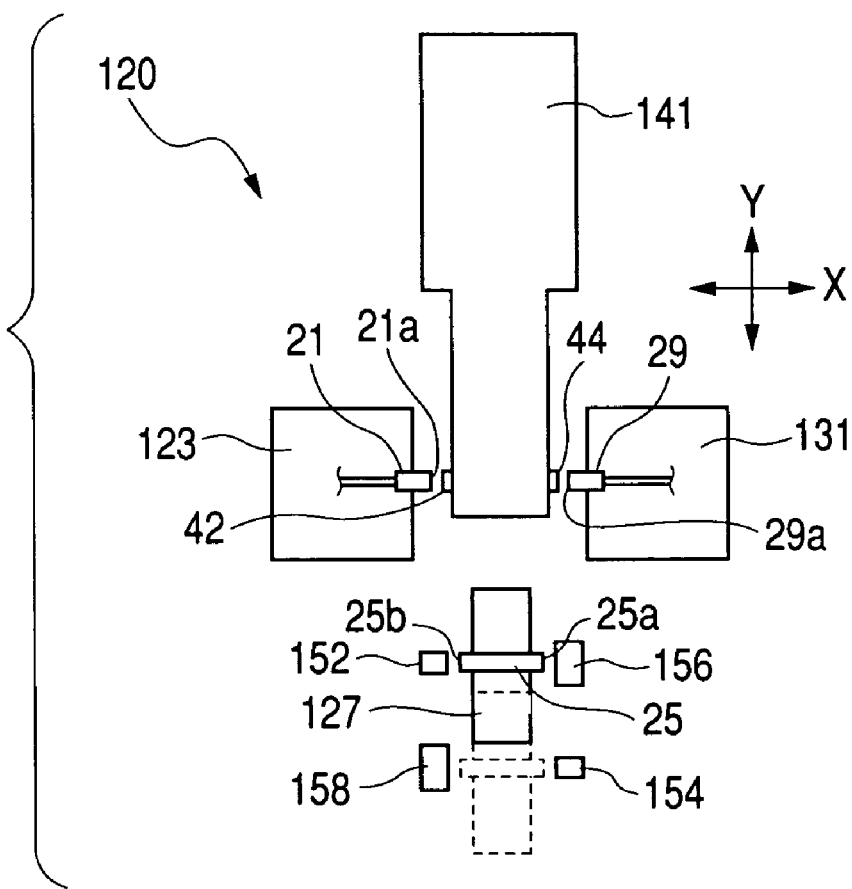
FIG. 12 schematically shows the outline of an optical transmission module according to another embodiment of the present invention as seen from above.

The principal parts of the connecting apparatus 120 shown in FIG. 12 include an input side array support table 123 for supporting an input side fiber array 21, a chip support table 127 for supporting a PLC chip 25, an output side array support table 131 for supporting an output side fiber array 29 and a two viewing field camera 141 the input side array support table 123 and the output side array support table 131 are movable in the X direction and opposed to each other with a predetermined distance therebetween with respect to the X direction. The chip support table 127 and the two viewing field camera 141 are opposed to each other on the Y axis. The chip support table 127 and the two viewing field camera 141 are adapted to be alternately inserted into and moved away from the space between the input side array support table 123 and the output side array support table 131.

The chip support table 127 is stopped at a first position and a second position (shown by the broken line) that is away from the space between the support tables 123 and 131. At the first position, there is provided a first camera 152 and a first light source 156 that are paired and opposed to each other in the X direction. At the second position, there is provided a second camera 154 and a first light source 158 that are paired and opposed to each other in the X direction. The position of each table and each camera can be adjusted along the X and Y axes indicated in FIG. 12 and Z axis that is orthogonal to the X and Y axes, if need be. Angular position of these parts can also be adjusted about the X, Y and Z axes. Since various know mechanisms may be used as the mechanism for adjusting the position and angular position of these parts, the description of the mechanism will be omitted.

The two viewing field camera 141 has a camera 42 for taking an image of the output side end face 21a of the input side fiber array 21 and a camera 44 for taking an image of the input side end face 29a of the output side fiber array 29. While disposed between the support tables 123 and 131, the two viewing field camera 141 takes images of the above-mentioned end faces so that the center of their cores is detected. The specific operation the two viewing field camera 141 is the same as that in the above-described embodiment, and the description thereof will be omitted. In the first position, light is radiated from the first light source 156 to the output side end face 25a of the PLC chip 25 in accordance with the condition mentioned before, and the first camera 152 takes an image of the input side end face 25b in accordance with the condition mentioned before. In the second position, light is radiated from the second light source 158 to the input side end face 25b of the PLC chip 25 in accordance with the condition mentioned before, and the second camera 154 takes an image of the output side end face 25a in accordance with the condition mentioned before. In this way, in the first position, the position of the core at the input side end face 25b of the PLC chip is detected, and the position of the core at the output side end face 25a of the PLC chip is detected.

Next, the operation of aligning and connecting the PLC chip 25 and the optical fiber arrays 21 and 29 using the connecting apparatus 120 will be described. Firstly, the chip support table 127 on which the PLC chip is supported is stopped at the first position. In that position, parallel light is radiated from the first light source 156 and the an image of the input side end face 25b is taken by the first camera 152. Subsequently, the chip support table 127 is moved to the second position, where parallel light is radiated from the second light source 158 and an image of the output side end face 25a is taken by the second camera 154, so that the operation of detecting the position of the output side core is performed.

Simultaneously, signal light or the like is introduced into the input side fiber array 21 and the output side fiber array 29. In that state, photographing of the output side end face 21a and the input side end face 29a is performed by the two viewing field camera 141. Based on the result of photographing, the operation of detecting the center of the core is carried out. After the core position detection operation is completed, the two viewing field camera 141 is moved away from the space between the input side array support table 123 and the output side array support table 131, and the chip support table 127 is moved to the position between those tables. The position of the center of the respective cores that has been determined by the detection process is finely adjusted by the respective support tables so that the core centers are aligned. After completion of the adjustment, the input side array support table 123 and the output side array support table 131 are moved close to each other with the chip support table 127 at the center. As per the above, by carrying out the present invention, it is possible to perform aligning operations called rough alignment and mid alignment at one time, and it is possible to reduce positional displacement of the cores of the members down to the order of several microns.

The aforementioned movement of the tables is stopped in the state in which the input side fiber array 21, the PLC chip 25 and the output side fiber array 29 are almost connected. In this state, signal light is introduced to the input side fiber array 21, and fine adjustment of the connection position of the input side fiber array 21 and the PLC chip 25 is performed based on the intensity of the optical signal obtained from the output side fiber array 29. After this fine adjustment is finished, fine adjustment of the connecting position of the PLC chip 25 and the output side fiber array 29 is carried out based on the optical signal intensity in the same state. After these fine adjustment operations are finished, the process of filling spaces between the members with adhesive or the like to fix and connect the members is carried out.

This modified embodiment is considered to be a little disadvantageous in keeping up alignment accuracy as compared to the above described embodiment, since the number of driven portions is increased and the number of the positions to be detected is increased. However, in the modified embodiment, mechanisms for changing the position and the orientation of the light sources and cameras can be constructed easily, and the modified embodiment is considered to be advantageous in terms of versatility. Although a two viewing field camera is used for taking images of end faces of the input and output fiber arrays, individual cameras may be used instead.

By carrying out the above-described alignment operation, it is possible to reduce positional displacement of the cores of the individual members down to the order of several microns by one alignment operation, and so-called fine alignment operation can be performed immediately. In addition, the position detection of the core is performed based on an analysis of an image obtained by a camera, and the time required for the analysis is less than a few seconds even if the time required for the actual alignment operation is included. Therefore, by carrying out the present invention, it is possible to manufacture an optical transmission module in a time shorter than in the conventional method with extremely high accuracy.

By employing the present invention, direct detection of the core position in various optical waveguides such as PLC chips, which has been conventionally difficult, can be made possible utilizing photographing by a camera or the like and binarization processing. Therefore, it is possible to detect the core position more accurately and in a shorter time than in conventional arts.

In addition, since the core can be detected by obtaining an image of an end face using an image pickup apparatus, it is possible to produce an apparatus without using a large, expensive optical apparatus such as a polarization microscope, contrary to the technology disclosed in the above-mentioned Japanese Patent Application Laid-Open No. 2003-121686. In addition, according to the present invention, the alignment and connection operation of each element can be carried out while the movement of the tables for supporting the PLC chip and the input and output fibers is made minimum. Therefore, it is possible to attain a higher degree of position accuracy as compared to conventional arts, and it is considered that a high degree of position accuracy can be kept easily.

What is claimed is:

1. An optical transmission module connecting method for performing alignment of an input side optical fiber array, an output side optical fiber array, and an optical transmission element including at least one of a lower substrate, a core, a cladding, an adhesive layer and an upper substrate in the interior thereof, and connecting their cores, comprising:
    making a first collimated beam incident on an output side end face of said optical transmission element and taking an image of an input side end face of said optical transmission element to detect the position of the core at said input side end face;
    making a second collimated beam incident on said input side end face of said optical transmission element and taking an image of said output side end face to detect the position of the core at said output side end face;
    detecting the position of a core of said input side fiber array and a core of said output side fiber array at their respective connection portions; and
    positioning the core of said input side fiber array at its connection portion and the core of said optical transmission element at its input side end face, and the core of said optical transmission element at its output side end face and the core of said output side fiber array at its connection portion respectively,
    wherein a first incidence angle is formed by said first collimated beam and a line orthogonal to said input side end face of said optical transmission element and a second incidence angle is formed by said second collimated beam and a line orthogonal to said output side end face of said optical transmission element, such that said first and second collimated beams introduced into the interior of said optical transmission element each are totally reflected at least at either one of boundary surfaces of the core and the cladding.

2. A connecting method according to claim 1, wherein upon taking an image of said input side end face or said output side end face of said optical transmission element, a camera used for the image taking takes an image of the end faces in a state in which the camera is inclined with respect to said input side end face or said output side end face at a predetermined angle.

3. A connecting method according to claim 1, wherein in the step of detecting the position of the core of the input side fiber array and said output side fiber array at their connection portion, light is introduced from an end portion other than said connection portion, and an operation of detecting the brightest portion in a light image observed at said connection portion as the center of said core is performed.

4. An optical transmission module connecting apparatus for performing alignment of an input side optical fiber array, an optical transmission element including at least one of a lower substrate, a core, a cladding, an adhesive layer and an upper substrate in the interior thereof and an output side optical fiber array, and connecting their cores, comprising:
    a chip support table for supporting said optical transmission element;
    an input side array support table for supporting said input side fiber array;
    an output side array support table for supporting said output side fiber array;
    a first light source for launching a first collimated beam into the interior of said optical transmission element from an output side end face of said optical transmission element;
    a first camera for taking an image of an input side end face of said optical transmission element revealed by said first collimated beam emitted from said first light source;
    a second light source for launching a second collimated beam into the interior of said optical transmission element from said input side end face of said optical transmission element;
    a second camera for taking an image of said output side end face of said optical transmission element revealed by said second collimated beam emitted from said second light source;
    a third camera for taking an image of an end face of said input side fiber array;
    a fourth camera for taking an image of an end face of said output side fiber array; and
    driving means for driving said input side array support table, said chip support table and said output side array support table based on a result of the image taking by said first to fourth cameras,
    wherein said first light source launches the first collimated beam into the interior of said optical transmission element from said output side end face at such an angle with which said collimated beam is totally reflected at least either one of boundary surfaces of the core and the cladding in the interior of said optical transmission element; and
    said second light source launches the second collimated beam into the interior of said optical transmission element from said input side end face at such an angle with which said collimated beam is totally reflected at least either one of boundary surfaces of the core and the cladding in the interior of said optical transmission element.

5. An apparatus according to claim 4, wherein said first camera is disposed obliquely with respect to said input side end face of said optical transmission element at a predetermined angle and said second camera is disposed obliquely with respect to said output side end face of said optical transmission element at a predetermined angle.

6. An apparatus according to claim 4, wherein in a process of detecting the position of a core of the input side fiber array at its connection portion, light is introduced from an end portion other than said connection portion, and said third camera detects the brightest portion in a light image observed at said connection portion as the center of said core, and in a process of detecting the position of a core of the output side fiber array at its connection portion, light is introduced from an end portion other than said connection portion, and said fourth camera detects the brightest portion in a light image observed at said connection portion as the center of said core.

7. A method of detecting the position of a core in an optical waveguide including a lower substrate, the core, a cladding, an adhesive layer and an upper substrate in the interior thereof, comprising:

making a first collimated beam incident on an output side end face of said optical waveguide with a first incident angle formed by said first collimated beam and a first line orthogonal to said output side end face so that the first collimated beam is totally reflected by at least either one of boundary surfaces of the core and the cladding;

taking an image of the core at an input side end face of said optical waveguide revealed by said first collimated beam by means of a first camera to detect the position of the core;

making a second collimated beam incident on the input side end face of said optical waveguide with a second incident angle formed by said second collimated beam and a second line orthogonal to said input side end face so that the second collimated beam is totally reflected by at least either one of the boundary surfaces of the core and the cladding; and taking an image of the core at the output side end face of said optical waveguide revealed by said second collimated beam by means of a second camera to detect the position of the core.

8. A method of detecting the position of a core in an optical waveguide including a lower substrate, the core, a cladding, an adhesive layer and an upper substrate in the interior thereof, comprising:

making a collimated beam incident on one side end face of said optical waveguide with an incident angle formed by said collimated beam and a line orthogonal to said one side end face so that the collimated beam is totally reflected by at least either one of boundary surfaces of the core and the cladding; and taking an image of the core at another side end face of said optical waveguide revealed by said collimated beam by means of a camera to detect the position of the core, wherein the brightest portion in said image of the core at the another side end face is determined as a center of the core.

* * * * *